United States Patent [19]

Petrone

[11] Patent Number: 5,791,364

[45] Date of Patent: *Aug. 11, 1998

[54] ATTACHMENT FOR STOPPER FOR PLASTIC GAS PIPELINES

[75] Inventor: Joseph Petrone, Ringwood, N.J.

[73] Assignee: Custom Service Laboratories of N.J., Inc., North Bergen, N.J.

[*] Notice: The term of this patent shall not extend beyond the expiration date of Pat. No. 5,439,032.

[21] Appl. No.: 497,928

[22] Filed: Jul. 5, 1995

Related U.S. Application Data

[63] Continuation-in-part of Ser. No. 380,210, Jan. 30, 1995, which is a continuation of Ser. No. 176,043, Dec. 30, 1993, abandoned, and a continuation-in-part of Ser. No. 294,372, Aug. 23, 1994, Pat. No. 5,439,032.

[51] Int. Cl.$^6$ .............................. F16K 43/00; F16L 55/128
[52] U.S. Cl. .......................... 137/15; 137/317; 137/318; 30/92.5; 30/93; 138/93; 138/97; 279/128; 408/239 R; 408/713
[58] Field of Search ............................ 137/15, 315, 318, 137/317; 138/93, 94, 97, 91; 279/128; 30/92.5, 93; 408/238, 239 R, 713

[56] References Cited

U.S. PATENT DOCUMENTS

| 1,760,750 | 5/1930 | Goodman | 138/93 |
| 1,922,003 | 8/1933 | Shuman | 138/93 |
| 1,946,138 | 2/1934 | Gardner | 138/93 |
| 2,811,985 | 11/1957 | Wells | 138/93 |
| 2,889,892 | 6/1959 | Schaub et al. | 138/93 |
| 3,842,864 | 10/1974 | Riegel et al. | 138/93 |
| 3,970,407 | 7/1976 | Uffman | 138/93 |
| 3,995,655 | 12/1976 | Sands | 137/318 |
| 4,127,141 | 11/1978 | Ledonne et al. | 137/318 |
| 4,144,908 | 3/1979 | Dunn | 138/93 |
| 4,155,373 | 5/1979 | DiGiovanni | 138/93 |
| 4,291,727 | 9/1981 | Yie et al. | 138/93 |
| 4,351,349 | 9/1982 | Minotti | 137/318 |
| 4,378,212 | 3/1983 | Waldron | 279/128 |
| 4,431,017 | 2/1984 | Willemsen | 137/318 |
| 4,509,343 | 4/1985 | Brister | 138/93 |
| 4,995,768 | 2/1991 | Craft | 279/128 |
| 5,052,431 | 10/1991 | Jiles | 137/318 |
| 5,065,780 | 11/1991 | Baumbach | 137/318 |
| 5,195,761 | 3/1993 | Eimer | 279/128 |
| 5,285,806 | 2/1994 | Ortega | 137/318 |

FOREIGN PATENT DOCUMENTS

| 0158419 | 1/1983 | Germany | 138/93 |

*Primary Examiner*—George L. Walton
*Attorney, Agent, or Firm*—Friscia & Nussbaum

[57] ABSTRACT

An inflatable gas pipeline stopper is used for stopping gas flow through pipelines to permit repairs to be made to gas pipelines. For plastic gas pipelines, a tapping tee is attached to the plastic gas pipeline and a gas tight apparatus having a valve is attached to the tee. Thereafter, the plastic gas pipeline can be cut with a pipe cutter that is engaged with a hexagonal head and magnetic attachment to be operated from the exterior of the air tight apparatus. The pipe cutter can be removed from the air tight apparatus and the valve of the air tight apparatus closed to prevent gas from escaping from the pipeline. The inflatable gas pipeline stopper with dual air bags can then be inserted into the plastic gas main, through the air tight apparatus and the tee, to stop the flow of gas through the pipeline. After repairs on the pipeline are complete, the inflatable gas pipeline stopper can be removed, the tee can be stopped, and the air tight apparatus can be removed.

14 Claims, 10 Drawing Sheets

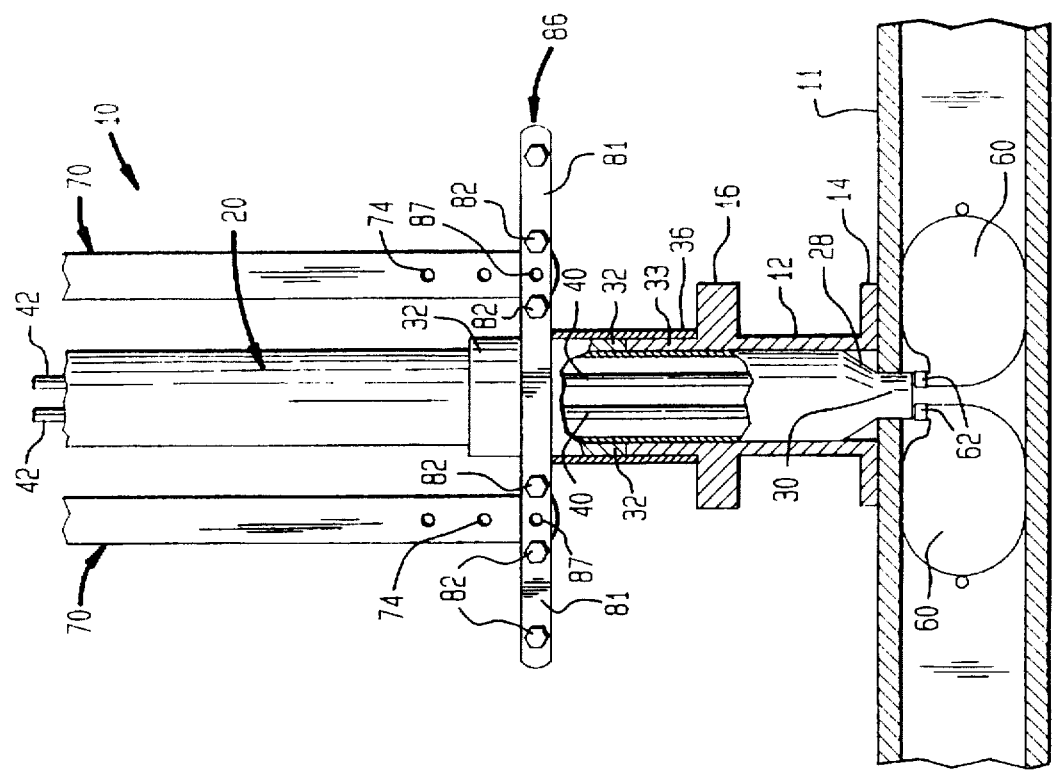
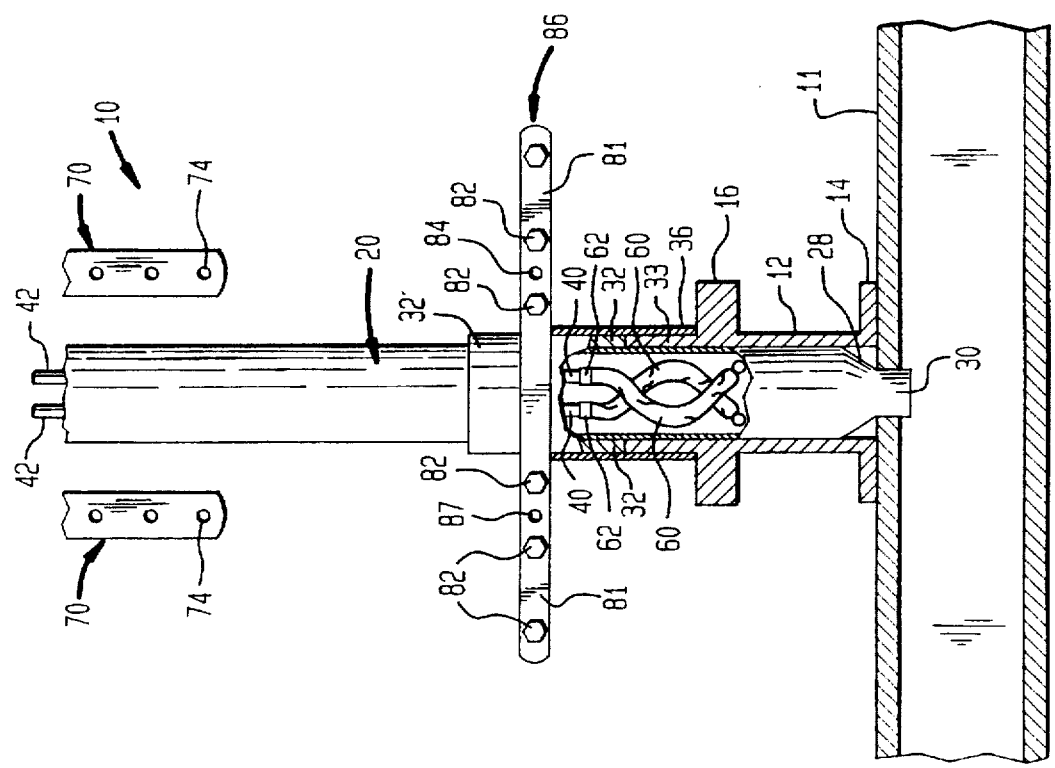

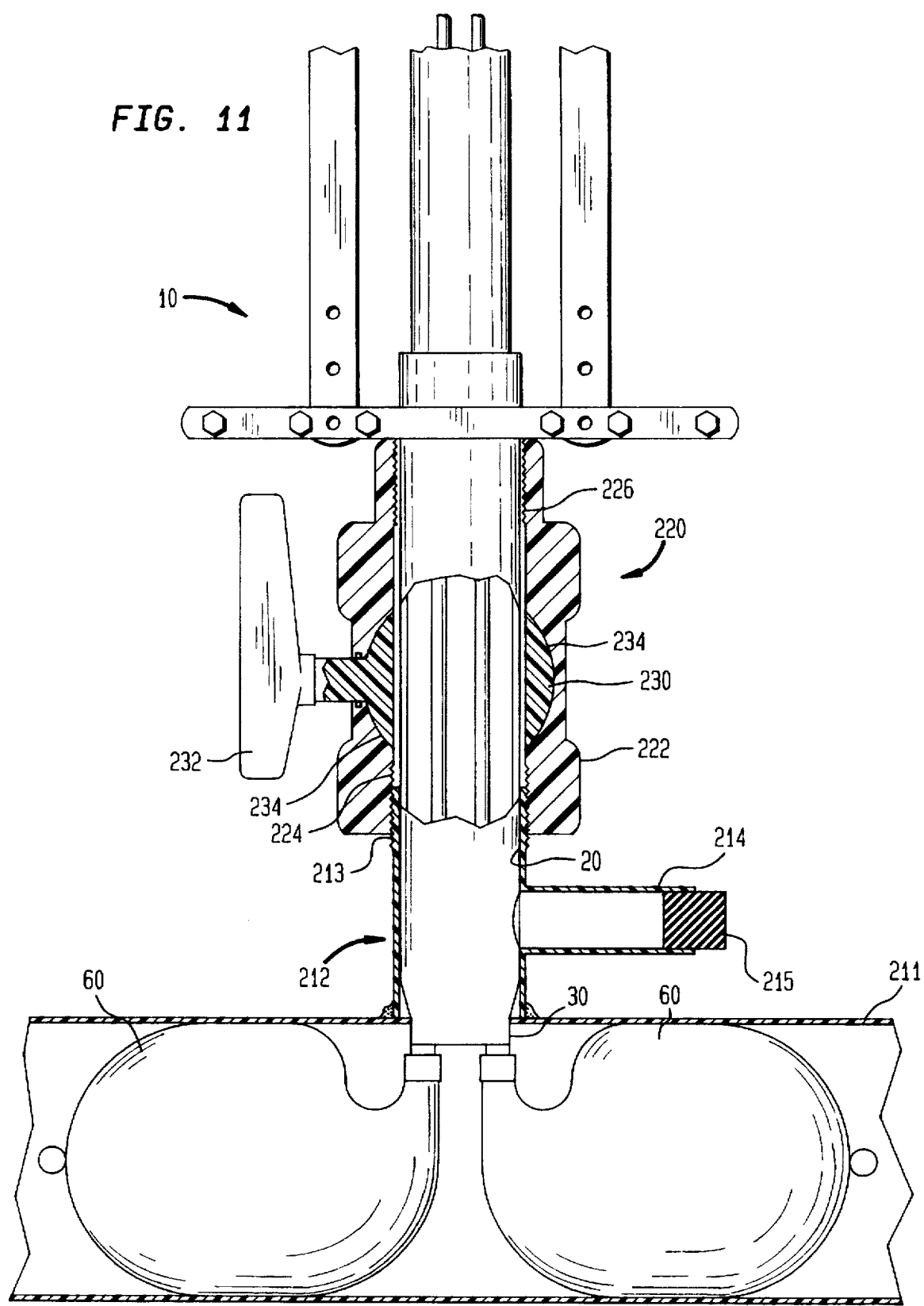

ATTACHMENT FOR STOPPER FOR PLASTIC GAS PIPELINES

BACKGROUND OF THE INVENTION

1. Related Applications

This application is a continuation-in-part application of U.S. patent application Ser. No. 08/380,210 filed Jan. 30, 1995, by Petrone, now pending, which is a continuation application of U.S. patent application Ser. No. 08/176,043 filed Dec. 30, 1993 by Petrone, abandoned. This application is also a continuation-in-part application of U.S. patent application Ser. No. 08/294,372 filed Aug. 23, 1994, by Petrone, now U.S. Pat. No. 5,439,032. The entire disclosure of these related applications is incorporated herein by reference.

2. Field of the Invention

The present invention relates to a method and apparatus for stopping gas flow through a broken gas pipeline to permit repairs to be made on the gas pipeline, and more specifically to an attachment for an inflatable gas pipeline stopper having dual inflatable air bags for stopping gas flow through a plastic gas pipeline.

3. Related Art

There have been many attempts in the past to provide an effective inflatable air bag type gas pipeline stopper to permit repairs to be made to broken gas pipelines. Currently, the standard procedure for achieving this requires tapping a hole in the gas pipeline to permit an inflatable stopper to be inserted into the pipeline. One of the devices used to cut a hole in the gas main is commonly known as a Mueller Co. Drilling and Tapping machine. The Mueller machine, as well as most other drilling and tapping machines made by other manufacturers, is generally cylindrical and extends up from its base. Upper ears are provided on the Mueller machine for supporting bolts that interconnect with a chain which extends around the pipe to secure the Mueller machine to the gas pipeline. The Mueller machine provides an airtight assembly with the gas pipe and accepts a drilling tool for drilling a hole through the pipe and a tapping tool for cutting internal threads therein. Thereafter, the Mueller machine is removed and an inflatable air bag type gas pipeline stopper may be inserted into the hole. When the Mueller machine is removed from the gas pipeline and during the insertion of the inflatable air bag type stopper, gas is continuously escaping from the tap hole.

In order to prevent gas from continuously escaping from the hole, it is necessary to weld an expensive flange onto a steel main prior to attaching the Mueller machine to it and then to use a mechanical device inserted through the Mueller machine to stop the flow of gas in the pipeline. This procedure, designed for high pressure gas mains, is costly and time consuming when used on low pressure gas mains, however, there is no alternative low cost method currently available.

With plastic gas pipelines, a "Drisco Plastic Tapping Tee," or tapping tees sold by other manufacturers, is fused to the gas pipeline and then a hole is cut into the pipeline through the tapping tee. Thereafter, an air bag type stopper may be inserted into the gas pipeline to stop gas from flowing through the gas pipeline. Currently, there is no apparatus available for preventing gas from escaping through the hole after it has been cut and before the gas pipeline is stopped. This not only wastes money associated with the lost gas, but it is also hazardous in that gas leaks in an area where work is being conducted.

It is a common safety practice when stopping off low pressure gas mains to use two inflatable type pipeline stoppers in series, one facing upstream and the other facing downstream, with a pipe positioned therebetween for venting into the atmosphere any gas that escapes past the upstream bag so that such gas will not seep into the section of pipe being worked on in the downstream area since this would cause a serious hazard due to the fact that welding is typically required to repair or replace the gas main. Since many of the older cast iron and steel gas mains have irregular and rusty interiors it is often difficult to get a gas tight seal. Therefore, two bags are always used with a vent between them. Furthermore, in the event that one inflatable pipeline stopper should rupture, there is always a backup. It should be noted that this double bagging system is applied to all low pressure steel, cast iron and even plastic gas mains.

Importantly, all of the inflatable air bag type pipeline stoppers in the prior art comprise a single air bag. Therefore, to effectively stop gas flow through a low pressure gas pipeline, two separate gas pipeline stoppers must be used on each side of the break in the gas pipeline, for a total of four separate gas pipeline stoppers. Further, a vent must be positioned between each pair of stoppers to vent gas buildup therebetween. Accordingly, a total of three holes must be drilled into the low pressure gas pipeline in each side of the broken the gas pipeline. This typically requires drilling and tapping a number of holes and digging a rather long trench through the ground to reach the various areas of the gas pipeline. This procedure is very time consuming and costly. None of the prior efforts have effectively reduced the need for more than one gas pipeline stopper on each side of a break in a low pressure gas pipeline or the requirement that a plurality of holes must be drilled in the gas pipeline to stop the flow of gas therethrough. These prior attempts include:

Gardner, U.S. Pat. No. 1,946,138, which discloses a pneumatic stopper for a gas pipe including an air bag for stopping the pipe. The device includes a tubular housing and an inflatable bag, interconnected with an air tube which extends within the tubular housing. The air tube and bag may be moved downward with respect to the tubular housing to extend into the pipe after the housing has been threadably attached to the pipe. The air bag may then be inflated to stop the pipe.

Ankarlo, U.S. Pat. No. 3,019,819, discloses a flow stopping apparatus for a gas pipe comprising a device that is inserted into a small lateral opening formed in the pipe. The device includes a frame structure which, in a collapsed condition, is elongated and relatively narrow and which is constructed such that the peripheral portions thereof may be forced into a substantially circular shape after insertion of the stopping device into the pipe. An inflatable tube is inserted into the expansible frame for expanding the stopping device within the gas pipe.

Bacon, U.S. Pat. No. 3,805,844, discloses a plugging device for a pipeline having a tapping means, an expandable bag that may be expanded with water, and means to create a freezing temperature to freeze water and expand the bag to plug the pipe.

Riegel, et al., U.S. Pat. No. 3,842,864, discloses a line stopper comprising a housing that can be mounted to a conventional pipe tapping machine and a bag insertion assembly mounted in the housing. The insertion assembly includes a slidable insertion tube and an inflatable bag connected at the lower end thereof. The bag has a rigid neck connected by a knuckle means to the insertion tube to enable the bag to be pivoted into the pipe. The housing is secured to the valve assembly by two pairs of ears which extend outward from the base and which are clamped to the valve assembly by bolts. When the bag is placed into the pipe the insertion tube covers the edge of the hole in the pipe to prevent abrasion between the bag and the edge of the hole in the pipe.

McKinnon et al., U.S. Pat. No. 3,973,584, discloses a piercing valve for tapping pipelines for adjusting pressurized gas. The device includes upper and lower blocks with registering grooves assembled about a pipeline.. A piercing needle is then moved upward to provide communication through the pierced hole into an upper transfer passageway in the upper block.

Calandra, U.S. Pat. No. 4,013,097, discloses an apparatus for damning the flow of fluid in a pipeline comprising an inflatable bladder wherein an outer bag of the bladder and an inner bag of the bladder are separated by fluid. The device is placed within a pipe and the bladder is inflated, thereby forcing the outer bag, through the liquid, to seal the pipeline.

Van der Lans, U.S. Pat. No. 4,079,755, discloses an inflatable pipe plug having a series of reinforcing strips of rubber sandwiched between inner and outer molded rubber members. The device includes a metal head. A metal cap, having an air inlet therein, is attached to the metal head to complete the assembly.

DiGiovanni, U.S. Pat. No. 4,155,373, discloses a method for shutting off gas in plastic pipes including a balloon-type stopper which may be inserted into the pipe and inflated to block the flow of gas. A ringlike compression seal is provided to prevent the escape of gas around the cutting tool during the cutting operation and to prevent gas leakage when the stopper is inflated within the pipe. The device includes a cylinder having an inflatable balloon therein which may be slid down and into the pipe and inflated by pump means.

None of these prior efforts provide the advantages or benefits of the present invention, e.g. reducing the number of holes that must be drilled into a pipe to stop gas flow therethrough. Additionally, none of these prior efforts teach or suggest using dual air bags extending from one gas pipeline stopper with both air bags being inserted through the same hole cut into a gas main to provide a seal to stop the flow of gas through a gas pipeline. Nor do any of these references teach a means of venting gas escaping past the upstream air bag through the same hole. Furthermore, prior art efforts do not teach or suggest the use of dual air bag type pipeline stoppers capable of being inserted or used through conventional gas tight drilling and tapping machines thereby preventing gas from continuously escaping during these procedures. Finally, none of these previous efforts teach or suggest an apparatus for use with plastic gas pipelines for preventing gas from escaping during the procedure of cutting the gas pipeline to insert an air bag type stopper or during the procedure of inserting the stopper into the plastic gas pipeline.

OBJECTS AND SUMMARY OF THE INVENTION

It is a primary object of the present invention to provide a gas pipeline stopper that reduces the amount of holes that are needed to be drilled into a gas pipeline to stop the flow of gas through the gas pipeline.

It is an object of the present invention to provide a gas pipeline stopper which may be used to stop the flow of gas in a steel, cast iron or a plastic gas pipeline.

It is another object of the invention to provide a gas pipeline stopper having two air bags extending from the device that is capable of being inserted into the gas pipeline through only one hole cut into the gas pipeline.

It is even another object of the invention to provide a gas pipeline stopper having dual directional air bags which extend from the gas pipeline stopper in opposite directions into the gas pipeline.

It is a further object of the present invention to provide a gas pipeline stopper having dual air bags and a means for venting gas from the space between the dual air bags through the same tap hole through which said air bags are inserted into a gas main.

It is still a further object of the present invention to provide an inflatable air bag type gas pipeline stopper that may be used with a conventional Mueller machine without the necessity of welding a costly flange onto a steel gas main.

It is an additional object of the present invention to provide an apparatus for preventing gas from escaping from a plastic gas pipeline during the procedure of cutting a hole in the plastic gas pipeline for receiving stopper.

It is even an additional object of the present invention to provide an apparatus for preventing gas from escaping from a plastic gas pipeline during the procedure of inserting a stopper in the gas pipeline.

It is even another object of the present invention to provide an apparatus for preventing gas from escaping from a plastic gas pipeline during the procedure of removing a stopper from the gas pipeline.

It is still another object of the present invention to provide an apparatus for use in connection with a tapping tee on a plastic gas pipeline for preventing gas from escaping from the pipeline before and after stopping the pipeline.

It is another object of the present invention to provide a gas pipeline stopper that can effect a gas tight seal between the gas pipeline stopper and the pipeline.

It is even a further object of the present invention to provide a gas pipeline stopper with dual inflatable air bags which air bags may be rapidly deflated.

It is yet a further object of the present invention to provide a gas pipeline stopper with dual inflatable air bags wherein the pressure within the air bags may be monitored.

It is even another object of the present invention to provide a gas pipeline stopper having dual air bags and a venting means for venting gas between the dual air bags, which venting means may be manually controlled from the exterior of the gas pipeline stopper.

It is yet another object of the present invention to provide a gas pipeline stopper with dual directional air bags wherein the direction that the air bags extend in the gas pipeline can be controlled and indicated from the exterior of the gas pipeline stopper.

It is yet another object of the present invention to provide a gas pipeline stopper having dual air bags wherein the gas pipeline stopper has a protective collar for preventing the air bags from contacting the abrasive edges of a hole drilled in the gas pipeline.

These objects and advantages are achieved by the inflatable gas pipeline stopper of the present invention, which is used to stop gas flowing through a pipeline when effecting repairs of the pipeline. The invention functions in connection with a standard Mueller machine or drilling and tapping machines sold by other manufacturers used to drill a hole in a gas pipeline. The invention includes a cylindrical stopper housing that is inserted into a Mueller machine or other similar type machines. A stuffing box is provided so that there is an air tight fit between the gas pipeline stopper and the Mueller machine.

In another embodiment of the invention, the inflatable gas pipeline stopper of the present invention is used for stopping gas flow through a plastic gas pipeline. In this embodiment, a tapping tee is attached to the plastic gas pipeline and a gas tight apparatus is attached to the tapping tee. Thereafter, the plastic gas pipeline can be cut with a pipe cutter, and the inflatable gas pipeline stopper can be inserted into the plastic gas main, through the air tight apparatus and the tapping tee to stop the flow of gas through the pipeline. After repairs on the pipeline are complete, the inflatable gas pipeline stopper can be removed, the tapping tee can be stopped, and the air tight apparatus can be removed.

Within the inflatable gas pipeline stopper housing extend two moveable bag inserting and retracting plunger assemblies attached to an air source at the tops thereof. After the device is inserted into the Mueller machine or other similar type machine, or a tee and air tight apparatus, and fastened thereto, the moveable bag inserting and retracting plunger assemblies are pushed through the housing to extend into the gas pipeline. Air is then pumped through air pipes of the moveable bag inserting and retracting plunger assemblies to inflate the air bags to stop the flow of gas through the gas pipeline. The air pipes are pushed into and retracted with respect to the housing and the gas pipeline by means of adjustable handles extending from the moveable bag inserting and retracting plunger assemblies along the exterior of the stopper housing and which may be unhooked at their bottom supports so that they can slide up and down to push into or retract the air pipes into or from the gas pipeline. Additionally, removable assemblies containing an air pressure gauge and a means of inflating and deflating are provided on top of the moveable bag inserting and retracting plunger assemblies for measuring the air pressure in the inflatable bags.

The inflatable gas pipeline stopper of the present invention may be used with various size gas mains and holes tapped into the gas pipeline by virtue of a series of removable adapters and protective collars at the base of the cylindrical stopper housing to extend into the various diameter holes tapped into a gas pipeline. The cylindrical stopper housing also contains a valve means for permitting the venting of any gas that gets past the upstream inflatable bag, the venting being accomplished through the same hole in the gas pipeline through which the dual inflatable air bags are inserted. Thus, gas can thus be vented into the atmosphere.

Additionally, two restraining cables extending between the cylindrical stopper housing and a Mueller machine or other similar type machine to prevent the entire device from accidentally sliding out of the Mueller machine.

When the stop off is completed and the air bag must be retracted into the air bag inserting cylinder, it is extremely difficult to retract the air bag because it remains partially inflated. The inflatable gas pipeline stopper of this invention overcomes this by means of a venturi pump adaptor connection at the top of each moveable inserting and retracting plunger assembly.

Insertion and use of both inflatable air bags as well as venting are all accomplished through a single tap hole in the gas main rather than through a plurality of tap holes as is now common practice. Furthermore, this stopping off procedure may be accomplished while the gas main is under pressure without gas escaping from the tap hole since this present invention is capable of being adapted to any existing air-tight drilling and tapping machines currently in use.

BRIEF DESCRIPTION OF THE DRAWINGS

Other important objects and features of the invention will be apparent from the following Detailed Description of the Invention taken in connection with the accompanying drawings in which:

FIG. 3 is a partially cut away front plan view of the gas pipeline stopper invention shown in FIG. 1 attached to a Mueller machine, which is attached to a gas pipeline, showing the inflatable air bags within the cylindrical housing.

FIG. 4 is a partially cut away front plan view of the gas pipeline stopper invention shown in FIG. 3 with the dual air bags extended into the gas pipeline and inflated.

FIG. 11 is a partially cut away side plan view of the air tight apparatus shown in FIG. 6 having the inflatable gas pipeline stopper shown in FIG. 1 inserted therein and the dual air bags inflated to stop the flow of gas through a plastic gas pipeline.

DETAILED DESCRIPTION OF THE INVENTION

Figure 1:
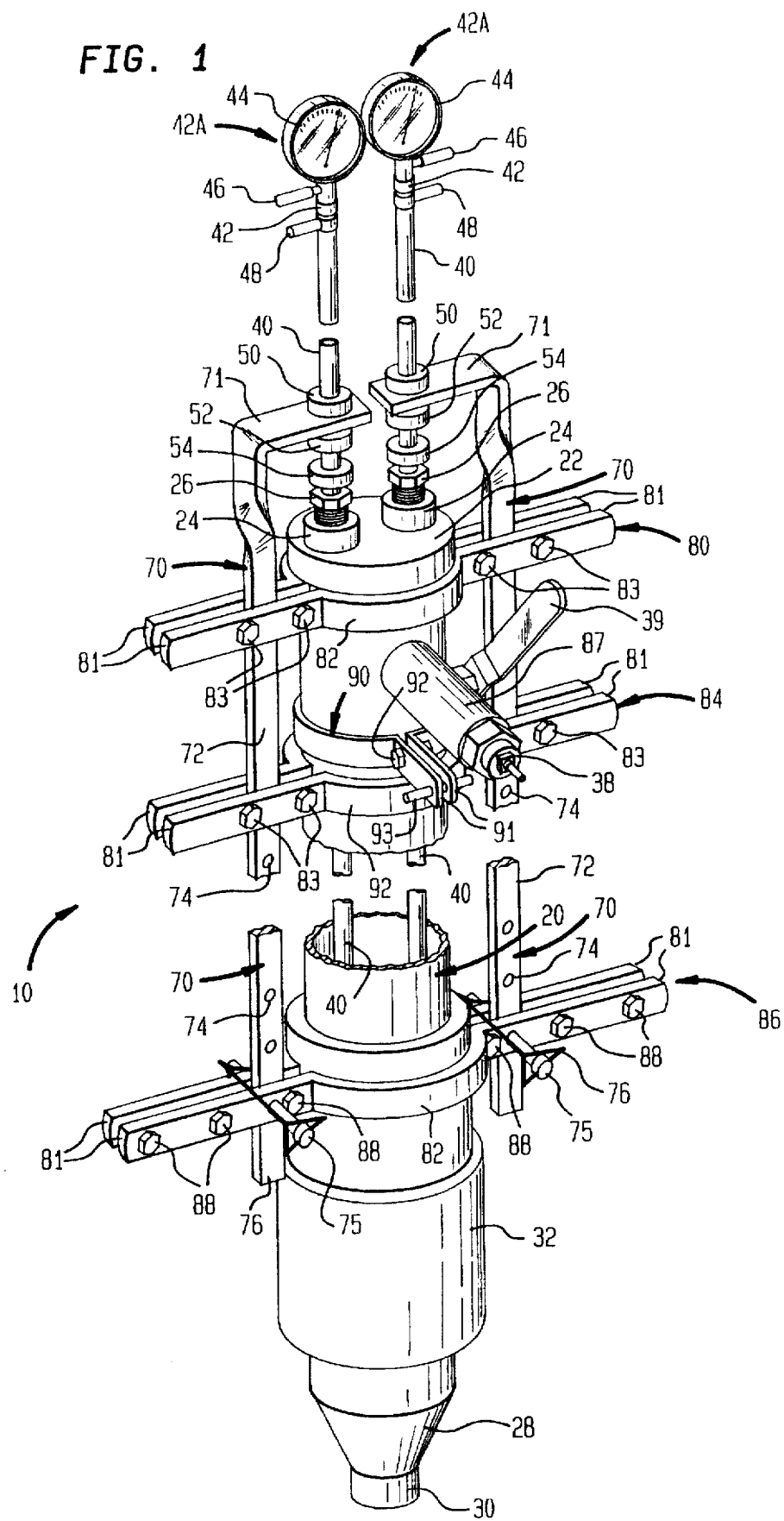
FIG. 1 is a perspective view of the gas pipeline stopper of the present invention.

The gas pipeline stopper of the present invention is indicated generally in FIGS. 1–4 by reference numeral 10. Referring to FIG. 1, the inflatable gas pipeline stopper 10 includes a cylindrical housing 20 comprising an elongated cylinder having a top 22 at one end and a removable reducer 28 at the other end. The removable reducer reduces the cylindrical housing 20 to a smaller diameter and terminates in insertion tip 30 which may be inserted into a hole drilled in a gas pipeline. The reducer 28 is preferably threadably engageable with the cylindrical stopper housing 20 and various reducers of different dimensions may be used on the cylindrical stopper housing 20 depending on the size of the hole drilled in the gas pipeline.

Extending from the cylindrical stopper housing 20 of the inflatable gas pipeline stopper 10 is a gas pressure relief valve 37 for relieving gas pressure within the housing 20 and venting the gas into the atmosphere. The pressure relief valve 37 includes a pressure relief nozzle 38 through which gas may be relieved and vented into the atmosphere and a pressure relief handle 39 which controls the relief of gas through the pressure relief valve 37 and the pressure relief nozzle 38.

The inflatable gas pipeline stopper invention 10 further includes dual moveable air bag inserting and retracting plunger assemblies having a number of components, including air lines 40 that extend into the housing 20 through aperture plugs 24 in the top of the housing 22. Aperture plugs 24 coact with aperture stoppers 26 and air lines 40 to provide an airtight seal between the air lines 40 and the housing 20.

The air lines 40 include removable assemblies 42A for inflating and deflating the air bags and monitoring the pressure within the air bags. These assemblies 42A are located at upper ends of the air lines 40 and include air pressure gauges 44. The assemblies 42A include intake valves 46 for receiving air from an external air source and valves 42 for communicating with the air lines 40. The assemblies 42A are attached to the top of the air lines 40 by means of a quick disconnect coupling to facilitate easy removal of the entire assembly.

Also provided on the upper end of the air lines 40 are adjustable directional bag indicators 48 which can be rotated on the air lines 40 to positions corresponding to the direction of the directional air bags, which will be described hereinafter, to indicate the direction in which the directional air bags are pointed when ejected into the gas main. As shown in FIGS. 3 and 4, the lower ends of the air lines 40 are interconnected with the directional air bags 60 by means of air bag connectors 62.

Interconnected with the air lines 40, as part of the removable bag inserting and retracting plunger assembly, are plunger handles generally indicated as 70. The plunger handles 70 include a horizontal portion 71 interconnected with the air line 40 and a vertical portion 72 extending along opposite exterior sides of the cylindrical stopper housing 20. The plunger handles 70 are attached and held in place on the air lines 40 by means of upper and lower air line collars 50 and 52 which prevent slidable movement of the horizontal portion 71 of the plunger handles 70 with respect to the air lines 40. Bottom air line collars 54 are also provided on the air lines 40 to coact with the aperture stopper 26 to restrain downward movement of the air lines 40 beyond a desired level.

The vertical portions 72 of plunger handles 70 extend along opposite sides of the cylindrical stopper housing 20, and are maintained in position by handle guides, namely upper fixed handle guide 80, mid fixed handle guide 84 and lower moveable handle guide with collar 86. The handle guides 80, 84, and 86 comprise opposing horizontal ears 81 extending therefrom. The semi-circular housing fittings 82 extend about the cylindrical stopper housing 20 and the horizontal ears 81 extend therefrom to face each other with a gap therebetween. Collar bolts 88 secure the opposing horizontal ears 81 of the collar together. Opposing horizontal ears 81 are spaced apart to permit the vertical portions 72 of the plunger handles 70 to extend therebetween. Accordingly, the handle guides 80, 84 and 86 serve to guide the plunger handles 70. The lower moveable handle guide with collar 86 includes a collar positioner aperture 87 (FIG. 3) through which positioning bolt 75 may extend. Further, the vertical portion 72 of the plunger handles 70 include positioning apertures 74 extending along a lower end of the plunger handles 70. Accordingly, these plunger positioning apertures 74 may be aligned with the collar positioner aperture 87 of the lower moveable handle guide with collar 86 so that positioning bolt 75 may extend through the positioner apertures 87 and the plunger positioning aperture 74 to restrain movement of the plunger handle 70 and thereby lock the entire moveable bag inserting and retracting plunger assembly, in a desired position. Further, a positioning bolt lock 76 is provided to lock the positioning bolt 75 in place.

Figure 2:
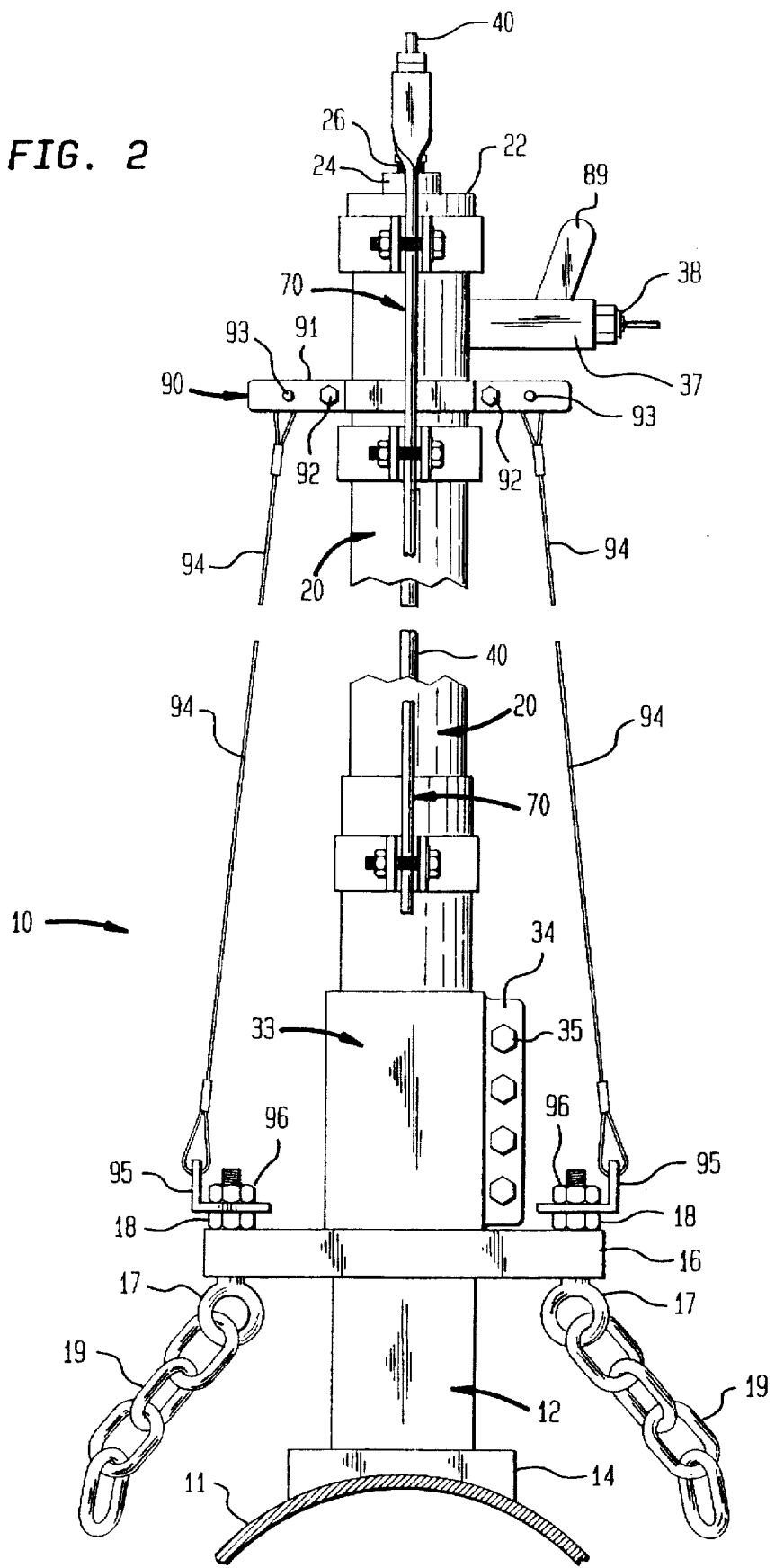
FIG. 2 is a side plan view of the gas pipeline stopper of the present invention shown in FIG. 1 attached to a Mueller machine which is attached to a gas pipeline.

The cylindrical stopper housing 20 of the inflatable gas pipeline stopper 10 is attachable to a pipe 11, as shown in FIG. 2, by means of a Mueller machine 12 or any other drilling and tapping machines sold by other manufacturers. The Mueller machine is interconnected with the pipe 11 by means of a removable flange 14 which is a component of the Mueller machine. The Mueller machine 12 includes ears 16 at an upper end thereof which include apertures for accepting eye bolts 17 or other attachment means for interconnecting with a chain 19 that extends around the pipe 11 to secure the Mueller machine 12 to the pipe 11. The eye bolt 17 extends through the aperture in the Mueller machine 12 and is fastened thereto by means of an eye bolt nut 18.

The cylindrical stopper housing 20 of the gas pipeline stopper invention 10 may include a rubber-like seal collar 32 (FIG. 1) wrapped about a lower end of the cylindrical stopper housing 20. When the lower end of the cylindrical stopper housing 20 is inserted into the Mueller machine 12, the rubber-like sealing collar 32 fits into a sealing clamp, generally indicated at 33, which clamp also extends about an upper portion of the Mueller machine 12. Within the clamp 33 is a liner 36 (FIG. 3) which coacts with the rubber like sealing collar 32 and the Mueller machine 12 to provide an air tight seal between the Mueller machine 12 and the cylindrical stopper housing 20 of the inflatable gas pipeline stopper 10. The sealing clamp 33 includes a clamp flange 34 having a plurality of bolts 35 for tightening the sealing clamp about the gas pipeline stopper 10 and the Mueller machine 12.

Also interconnected with Mueller machine or other similar type machines 12 are brackets 95 as shown in FIG. 2 which interconnect with the eye bolt 17 and are held in place by bracket nuts 96. The brackets 95, for example, an L-bracket 95, receives an end of a stabilizing cord 94 from the cylindrical stopper housing 20 of the inflatable gas pipeline stopper 10. The stabilizing cord is attached to the cylindrical stopper housing 20 by means of a stabilizing collar 90. The stabilizer collar 90 includes stabilizing collar semi-circular fittings 92 which extend about the housing, and opposing ears 91 extending therefrom. The stabilizing collars 90 are secured about the cylindrical stopper housing 20 by means of stabilizing collar bolts 97 extending through opposing ears 91. Removable stabilizer pins 93 extend between the stabilizing collar ears 91 for receiving the stabilizer cord 94. Accordingly, the stabilizer cord 94 is secured between an upper end of the cylindrical stopper housing 20 and the Mueller machine 12 to stabilize the inflatable gas pipeline stopper 10 with respect to the Mueller machine.

FIGS. 2 and 3 are cross sectional views of the inflatable gas pipeline stopper 10 of the present invention engaged with Mueller machine 12 and inserted into the gas pipeline stopper 11, for stopping flow of gas through pipeline 11. Accordingly, cylindrical stopper housing 20 is inserted into the Mueller machine 12 such that insertion tip 30 (FIG. 1) attached to reducer 28 extends through a hole tapped in gas pipeline 11. A rubber-like seal collar 32 on cylindrical stopper housing 20 contacts the upper edge of the Mueller machine 12. Sealing clamp 33 extends about the cylindrical stopper housing 20 and the rubber-like seal collar 32 and an upper portion of the Mueller machine 12 to provide an air tight seal between the cylindrical stopper housing 20 and the Mueller machine. Liner 36 is positioned to fit within the sealing clamp 33 to further provide for an airtight seal, and the sealing clamp 33 is clamped down via clamp bolts 35 through clamp flange 34 to secure the clamp around the cylindrical stopper housing 20 and the Mueller machine 12 to provide an air tight fit. It should also be noted that any means known in the art for providing an air tight fit between the housing 20 and the Mueller machine 12 are considered within the scope of this invention. Further, any connection means known in the art for connecting the cylindrical stopper housing 20 to the pipe, including any such means besides a Mueller machine, is within the scope of this invention.

As shown in FIG. 3, initially, the air bags 60 are retracted in the cylindrical stopper housing 20 prior to stopping the gas pipeline 11 and during the insertion of the cylindrical stopper housing 20 into the Mueller machine 12 and the insertion of insertion tip 30 into the gas pipeline 11. The air bags may be any air bags known in the art, but are preferably air bags constructed in accordance with the teachings of copending U.S. patent application Ser. No. 08/380,210 filed Jan. 30, 1995, by Petrone, which is a continuation application of U.S. patent application Ser. No. 08/176,043 filed Dec. 30, 1993 by Petrone, abandoned, and U.S. patent application Ser. No. 08/294,372 filed Aug. 23, 1994, by Petrone, now pending. The entire disclosure of these applications are incorporated herein by reference. Such air bags are directional in nature, having a rigid member within the air bag for pointing the air bag in a desired direction, and accordingly, one air bag 60 is positioned to point upstream and the other air bag 60 is positioned to point downstream. As hereinbefore set forth, directional indicators 48 on the movable bag inserting and retracting plunger assemblies are positioned to indicate the direction that the air bags 60 are pointed when they are ejected into the gas pipeline. The air bags 60 are impervious to fluid flow and when inflated within the pipeline 11 block flow of gas through the pipeline.

As shown in FIG. 3, the air bags 60 are positioned along side each other although, preferably, the air bags 60 are positioned one above the other, i.e. the upstream air bag 60 is positioned above the downstream air bag 60 in the housing. As such, the downstream air bag 60 can be inserted into the gas pipeline 11 first and inflated to block off the flow of gas through the gas pipeline 11, and then the upstream air bag 60 can be inserted into the pipeline 11 and inflated to coact with the first air bag 60 to prevent the flow of gas through the gas pipeline 11.

The air bags 60 are ejected into the gas pipeline 11 via the moveable bag inserting and retracting plunger assemblies. Moveable bag inserting and retracting plunger assemblies are controlled by handles 70 which extend along the exterior sides of the cylindrical stopper housing 20. Accordingly, as the handles 70 are moved from the position in FIG. 3 to the position shown in FIG. 4, the moveable bag inserting and retracting plunger assemblies and the air pipes 40 are brought down therewith and the air bags 60 are inserted into the gas pipeline 11 wherein they are inflated through valves 42 of the assemblies 42A. The air bags 60 are interconnected with the air lines 40 in any manner known in the art such as by air bag connectors 62.

When the air bags 60 are ejected into the gas pipeline 11 the handles 70 may be locked down via positioning bolt 75 extending through positioning apertures 74 in the handle collar ears 81 and through apertures 74 in the handle. Further, it should be noted that when the moveable bag inserting and retracting plunger assemblies are retracted within the cylindrical stopper housing 20, the handles 70 can likewise be locked in a similar manner, the attachment of the handles 70 to the air lines 40 being adjustable along the air lines 40 by movement of the upper and lower moveable bag inserting and retracting plunger assembly stop collars 50 and 52.

The inflatable gas pipeline stopper of this invention inserts two inflatable directional air bag type pipeline stoppers, one upstream and the other downstream, into a steel, cast iron or plastic gas pipeline. Additionally, this invention vents any gas escaping past the upstream air bag into the atmosphere. Further, it is necessary only to drill one hole in the gas pipeline is necessary to accomplish this. Previous to this invention, three separate holes had to be drilled and tapped into the gas pipeline at each side of a broken gas pipe.

The inflatable gas pipeline stopper of the present invention includes a gas-tight cylindrical stopper housing 20 with a venting port. The base is adapted to fit all Mueller machines, as well as the Drisco Plastic Tapping Tee or any drilling and tapping machines and/or tapping tees sold by other manufacturers, by means of a quickly removable gas-tight adaptor clamp which encircles the cylindrical stopper housing 20. The gas-tight clamp is designed to be compatible with, and can be easily attached to, the Drisco Plastic Tapping Tee, or tapping tees from other manufacturers as well.

Figure 5:
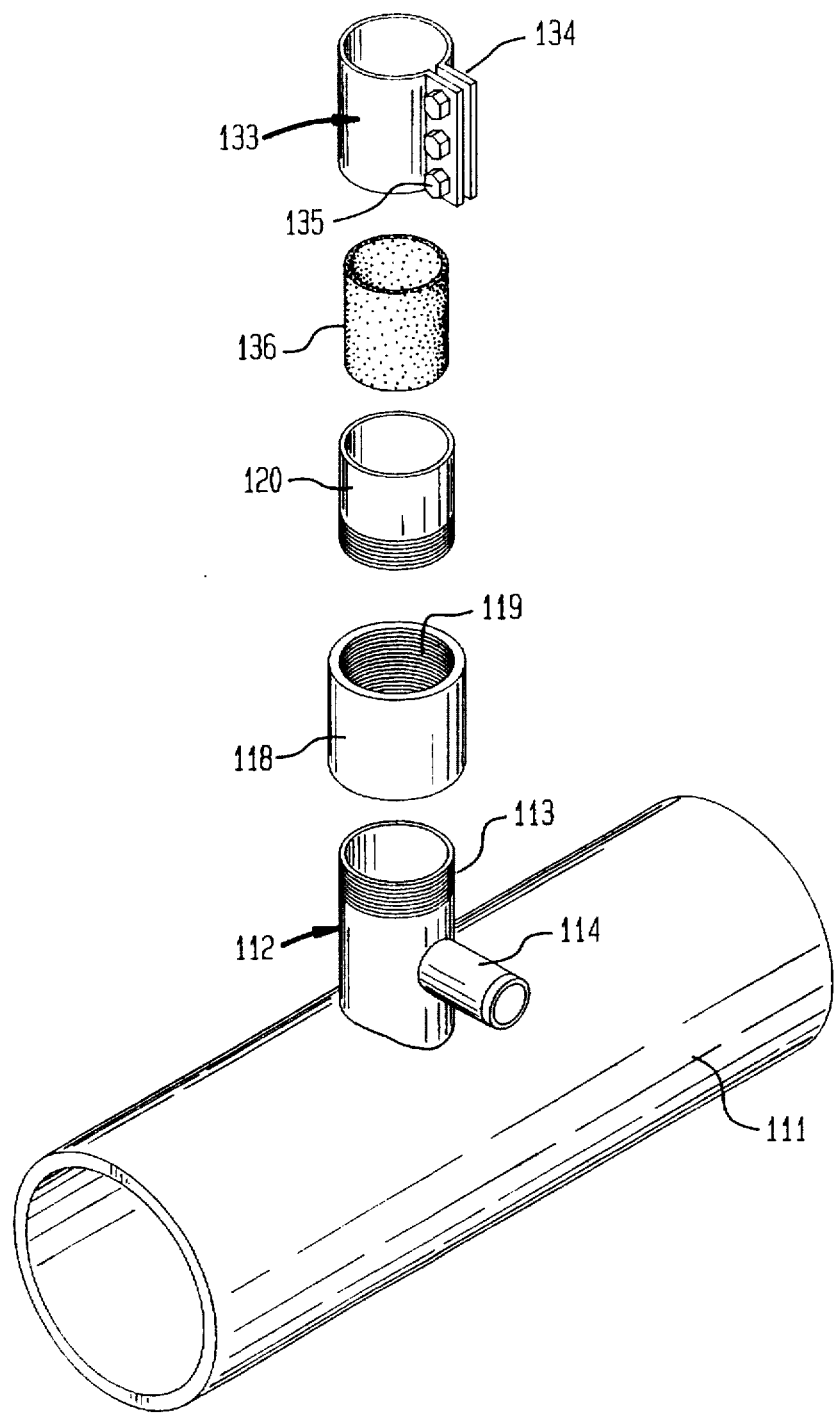
FIG. 5 is an exploded perspective view of the components of the attachment means for attaching the gas pipeline stopper of the present invention shown in FIG. 1 to a plastic gas pipeline.
Figure 6:
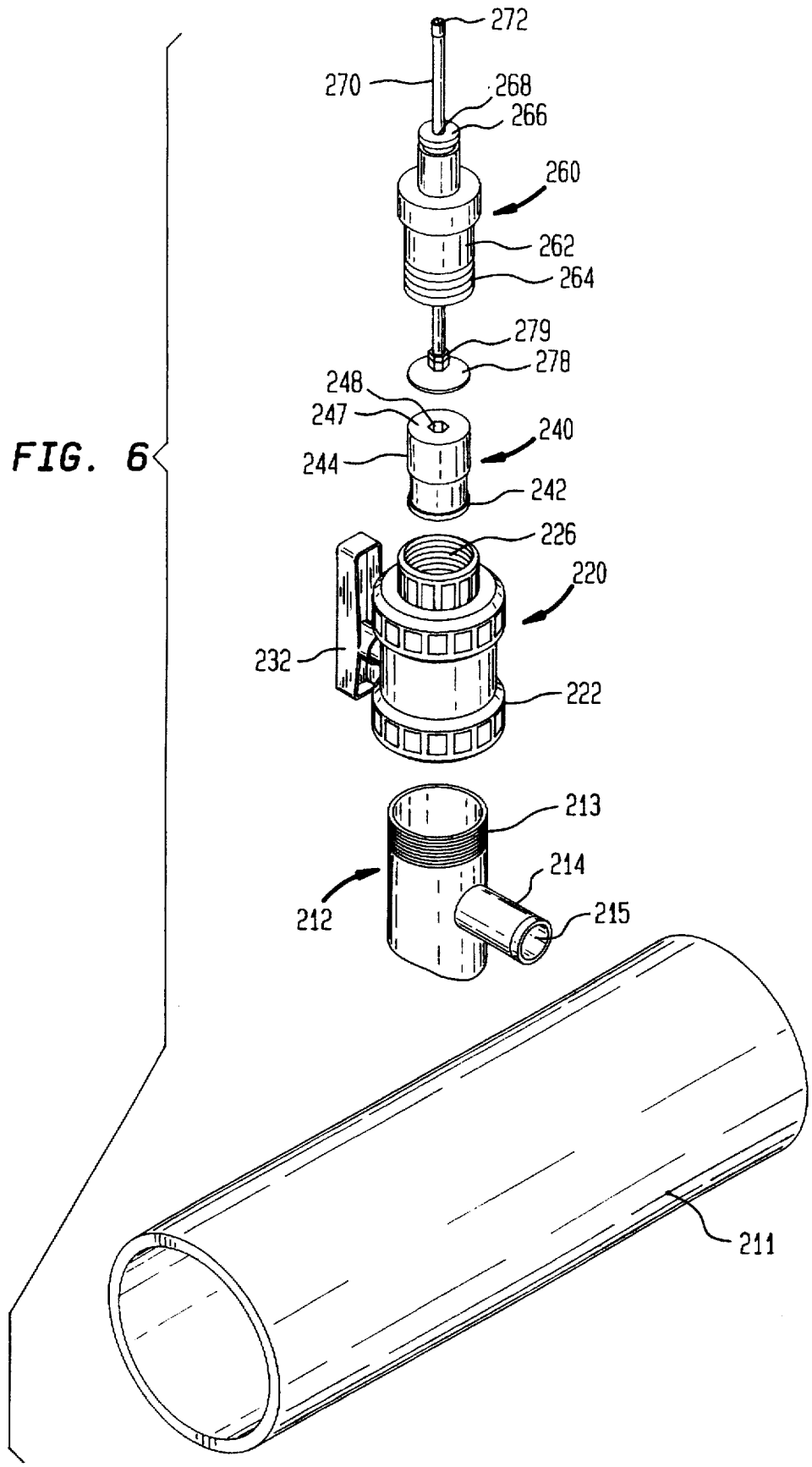
FIG. 6 is an exploded perspective view of the air tight apparatus and pipe cutter for use with the gas pipeline stopper of the present invention in connection with plastic gas pipelines.

Referring to FIG. 5, the tapping tee 112 is fused onto the plastic gas pipeline at the point where the stop-off is to be made and a hole is drilled therethrough into the gas main. The adaptor 118 for the tapping tee 112 comprises a plastic coupling having internal threads 119. The adaptor 118 is manually threaded to the external threads 113 of the tapping tee 112 through which the inflatable air bags are inserted into the plastic gas main 111. Threaded into the other end of the plastic coupling 118 is a short length of pipe 120 having the same diameter as the inflatable gas pipeline cylindrical stopper housing 20. After being threaded into the plastic coupling, this pipe 120 protrudes a short distance thereabove. The gas inflatable pipeline cylindrical stopper housing 20 is then attached to this pipe 120 by means of a gas tight clamp 133 which encircles both the housing and the pipe 120 thereby holding the entire assembly securely to the plastic tee 112. The clamp 133 includes a flange 134 with bolts 135 therethrough for tightening clamp 133 about the housing and the pipe 120. A rubber liner 136 may be used to effect an air tight seal between the cylindrical stopper housing 20 and the pipe 120. Operation of the inflatable gas pipeline stopper for stopping a plastic gas pipeline is the same as the with the operation for a steel or cast iron gas pipeline as hereinbefore described.

Since the upper end of the moveable bag inserting and retractor plunger assemblies are long and extended above the gas main being stopped off, it is somewhat difficult and awkward to raise and lower them. Furthermore, considerable upward force must be exerted on the moveable bag inserting and retracting plunger assembly in order to remove the partially deflated air bags from the gas pipeline and to reinsert them into the housing when the stop off is completed. In order to overcome these two problems, external to the cylindrical stopper housing 20 and attached to the air lines 40 are two vertically adjustable moveable bag inserting and retracting plunger assembly collars 50 and 52 which position and lock an external handle mechanism that slides vertically along the exterior of the gas-tight cylindrical stopper housing 200 thereby facilitating the movement of the moveable bag inserting and retracting plunger assembly from the base of the cylindrical stopper housing 20.

The air lines 40 may be rigid air pipes or alternatively could be flexible air lines supported at the upper and lower ends thereof by a rigid frame. In another embodiment, air lines could be replaced by channels within the stopper housing and the air bags could be ejected into the pipeline and retracted therefrom by means of air pressure. Likewise, the stopper housing itself could function as the air line and feed both air bags.

Referring now to FIGS. 6–11, another embodiment for connecting the gas pipeline stopper of the present invention to a plastic gas pipeline is shown. This embodiment includes a number of primary components including a tapping tee generally indicated at 212, an air tight apparatus 220, a cutter 240, and a driving tool 260. As with the previous embodiment for a plastic gas pipeline, a tee 212 is attached to the plastic gas pipeline 211 by welding or other means known in the art. The tee 212 has a contoured lower surface 216 for mating with the curvature of the plastic gas pipeline 211, a stem 214, a stem plug 215, and a threaded upper end 213.

After the tee 212 is attached to the plastic gas pipeline 211, the air tight apparatus 220 is attached to the tee 212 by threadable engagement therewith or by any other means known in the art. The air tight apparatus 220 includes a housing 222 having a generally cylindrical interior 223 with internal threads 224 and 226 at the lower and upper ends thereof, respectively. The air tight apparatus 220 further includes a ball valve 230 centrally located therein which is attached by means of a ball valve stem 231 extending through the housing 22 to ball valve handle 232 positioned exterior to the housing 222. The ball valve 230 is seated in ball valve recesses 234 in the cylindrical interior 223 and by actuating the ball valve handle 232, the ball valve 230 may be moved between a closed position, which prohibits air from passing through the air tight apparatus 220, and an open position which permits air, as well as instruments and the inflatable gas pipeline stopper to pass therethrough.

The cutter 240 of this embodiment of the invention comprises a cutter housing 244 which is generally cylindrical in shape, a cutting edge 242 at one end of the cutter housing 244, an interior 246 extending within the cutter housing 244, and an upper surface 247 of the cutter housing 244 having a hexagonal receptacle 248 formed therein for interconnecting the cutter 240 with a driving tool 260. The connection between the cutter 240 and the driving tool 260 could, of course, take on any other configuration known in the art. The cutter 240 is sized to pass through the cylindrical interior 223 of the housing 222 of the air tight apparatus 220.

The driving tool 260 of the present embodiment of the invention includes a housing 262, which is generally cylindrical and includes an interior 263, and which includes threads 264 on the lower end thereof for threaded engagement with the upper internal threads 226 of the air tight apparatus 220. The housing 262 also includes an upper end 266 having an aperture 228 therein for receiving an extension shaft 270 in air tight engagement therethrough. The extension shaft 270 includes a drive connection means 272 at an upper end thereof, and a hex head 274 at a lower end thereof for engaging the hex receptacle 248 of the cutter 240 for driving the cutter 240. The extension shaft 270 may also include a magnet 276 positioned in a magnet receptacle 278 located just above the hex head 274 for contacting and coacting with the upper surface of the cutter housing 247 to retain the hex head 274 in the hex receptacle 248 of the cutter 240 and to maintain engagement between the driving tool 260 and the cutter 240 during use of the apparatus. The magnet 276 and the magnet receptacle 278 may be interconnected with the extension shaft 270 by nuts or by any other means known in the art. It should also be noted that other means known in the art for engagement of the cutter and the driving tool are considered within the scope of this invention.

Figure 7:
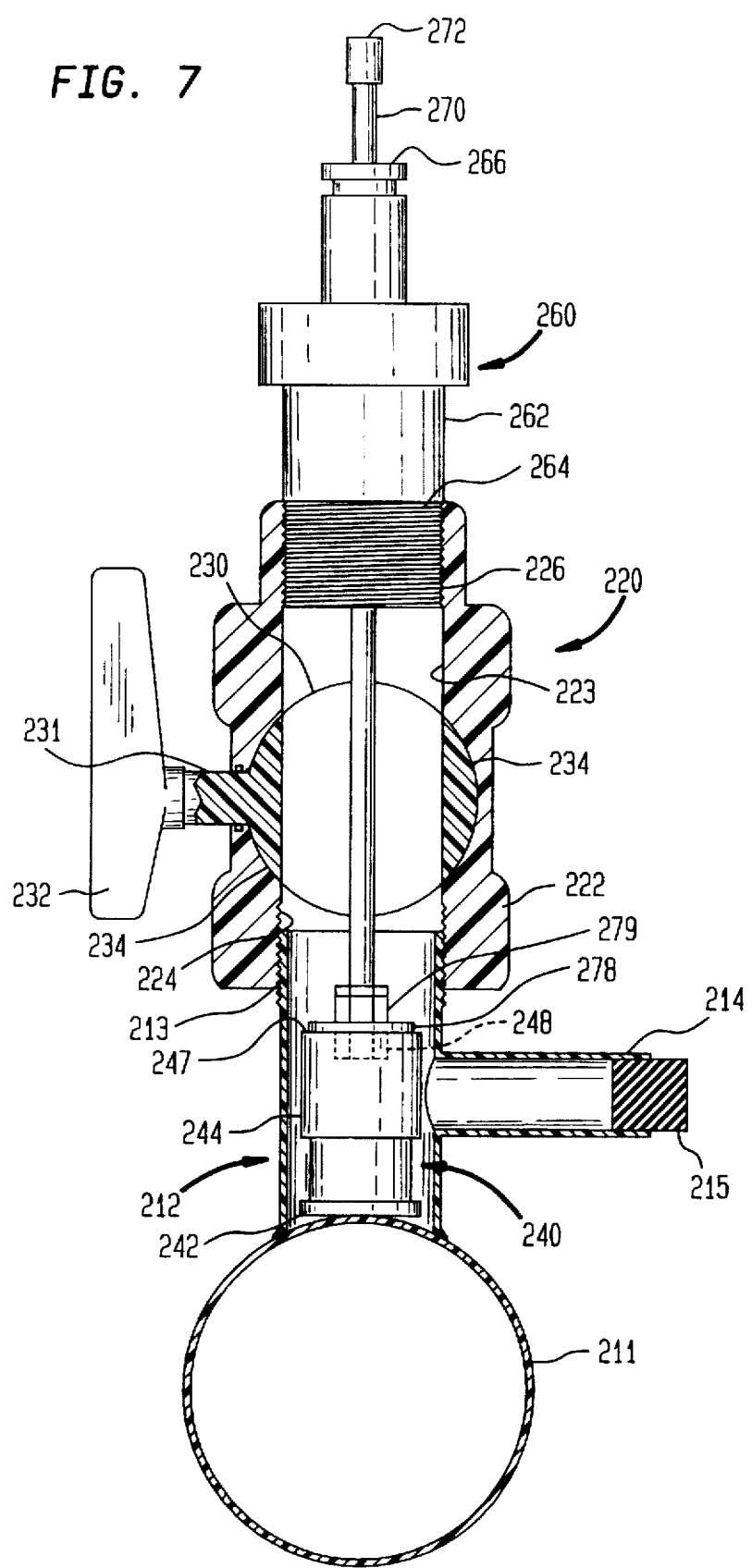
FIG. 7 is a partially cut away side plan view of the apparatus shown in FIG. 6 showing the pipe cutter extending through the air tight apparatus to contact the plastic gas main.

In operation, after the tapping tee 212 is attached to the plastic gas pipeline 211, the air tight apparatus 220 is threadably engaged with the tee 212. Thereafter, the cutter 240 is engaged with the driving tool 260 and the driving tool 260 is threadably engaged with the air tight apparatus 220. Next, the cutter 240 is plunged through the cylindrical interior 223 of the air tight apparatus 220 by means of the extension shaft 270 to bear the cutting edge 242 of the cutter 240 against the plastic gas pipeline 211. Note that during this procedure, the ball valve 230 is maintained in an open position. This is initial set up is shown in FIG. 7.

Figure 8:
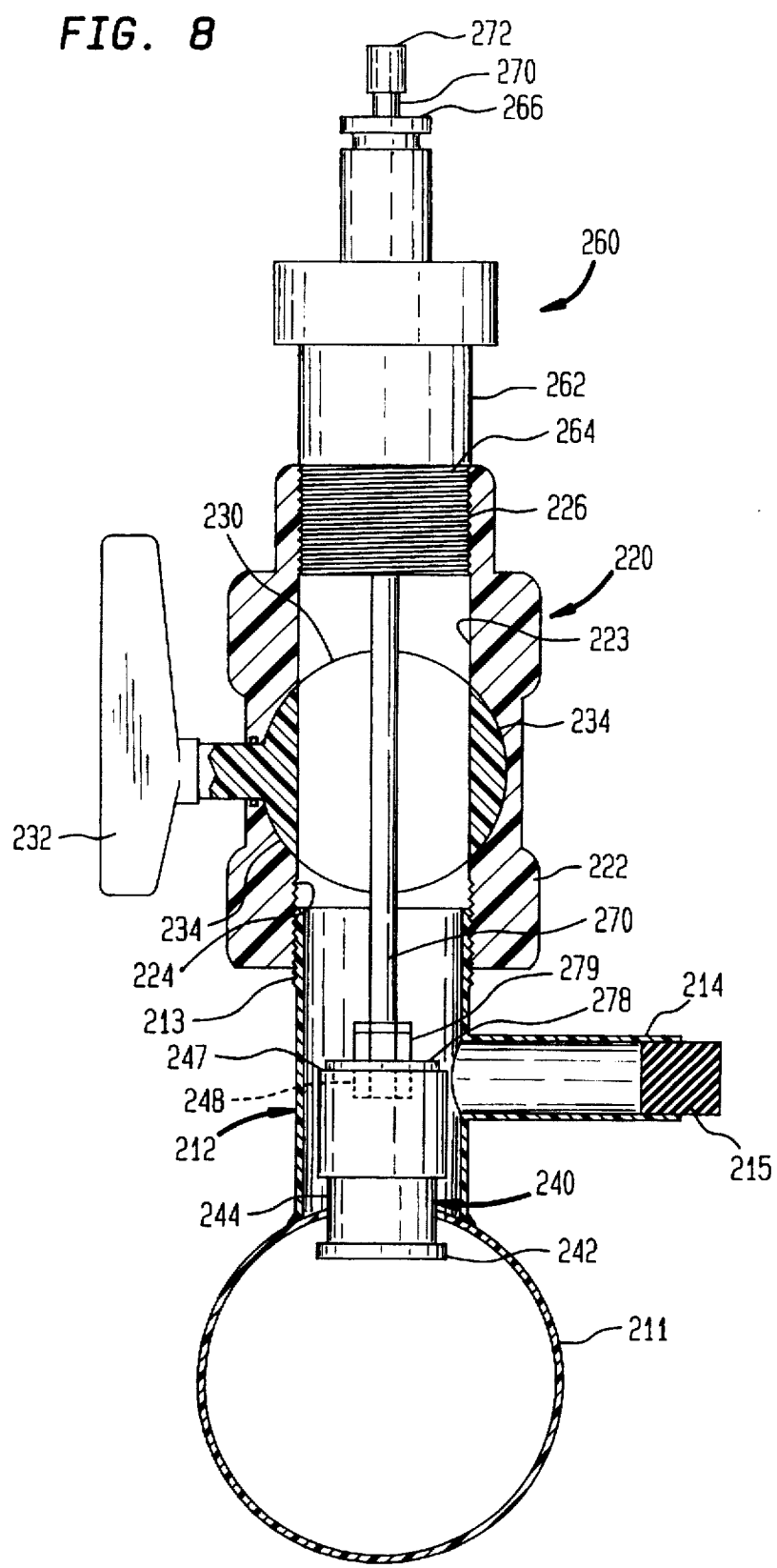
FIG. 8 is a partially cut away side plan view of the apparatus shown in FIG. 7 showing the pipe cutter extending through the plastic gas pipeline.
Figure 9:
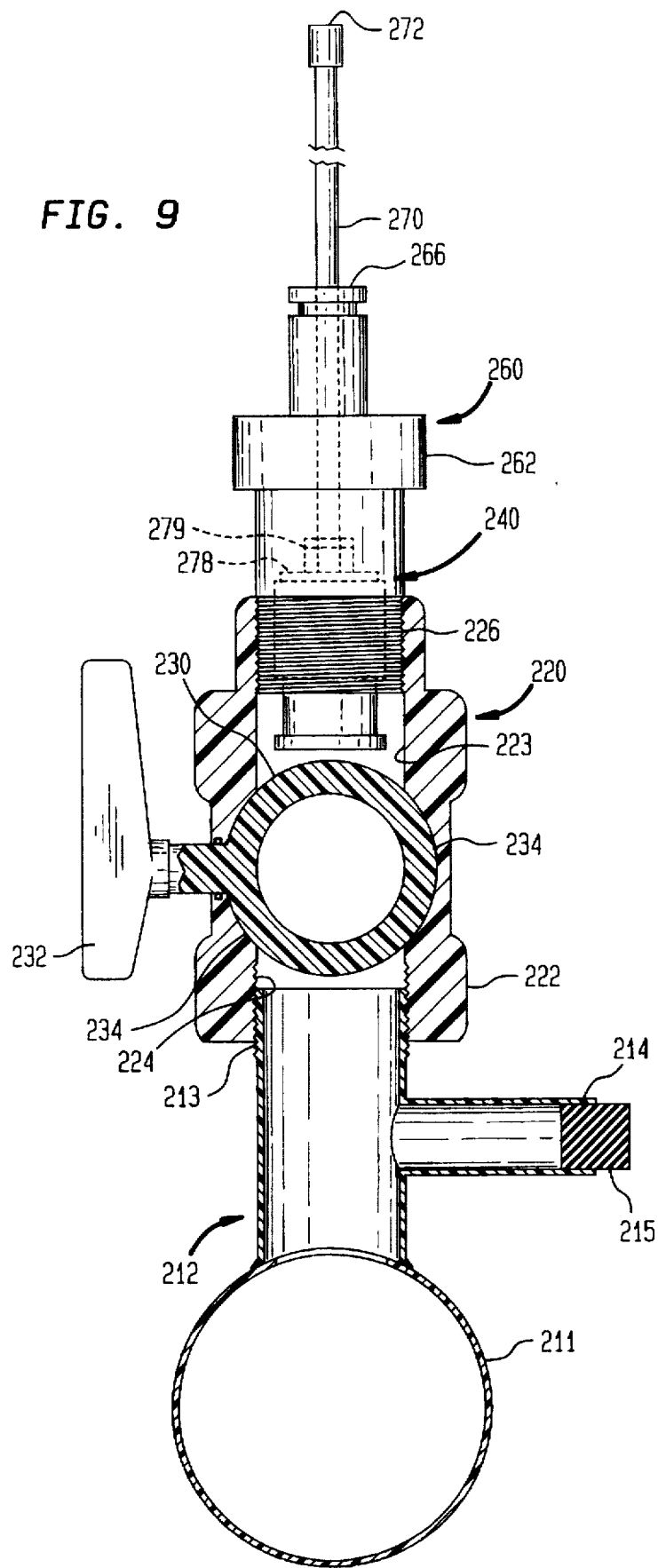
FIG. 9 is a partially cut away side plan view of the apparatus shown in FIG. 8 showing the pipe cutter retracted from the air tight apparatus and showing the air tight apparatus closed to prevent gas from escaping from the plastic gas pipeline.
Figure 10:
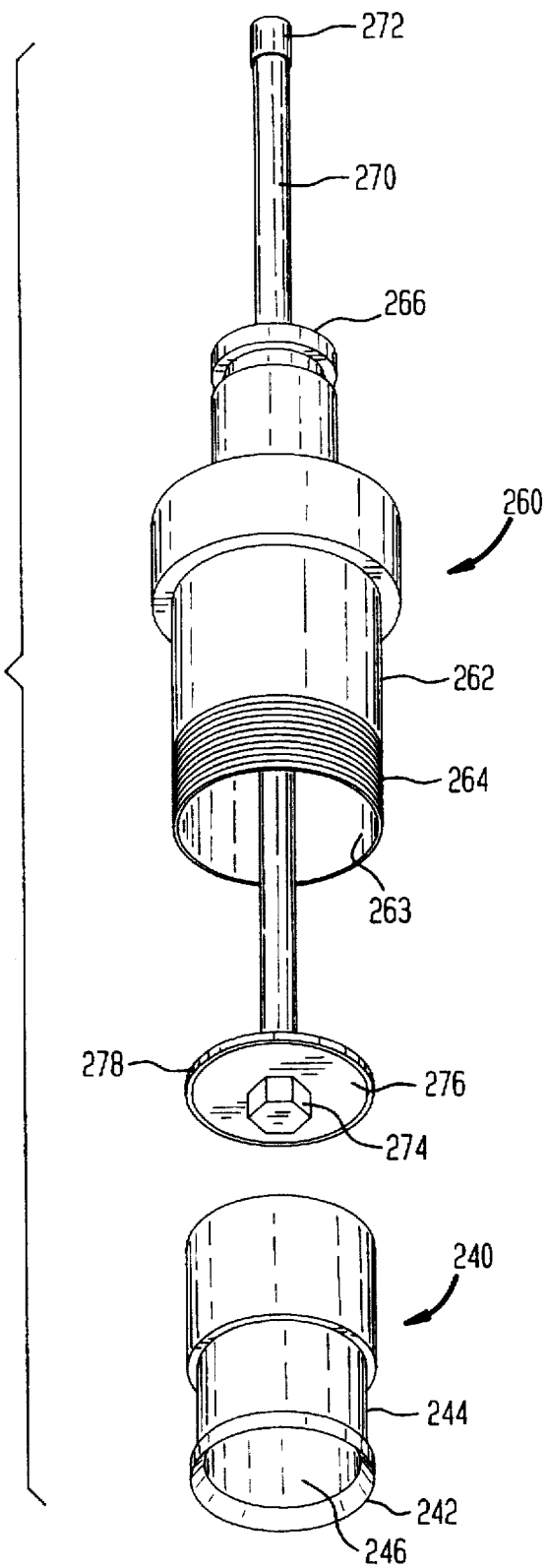
FIG. 10 is an exploded perspective view of the pipe cutter shown in FIG. 6 for use with the air tight apparatus shown in FIG. 6.

As is shown in FIG. 8, the driving tool 260 is then actuated by a driving means (not shown) to coact with the cutter 240 to cut a hole in the plastic gas pipeline. The cutter 240 is then retracted up through the air tight apparatus to above the ball valve 230. It should be noted that the gas is not permitted to escape from the plastic gas pipeline 211, through the air tight apparatus, because of the air tight properties of the engagement between the tee 212 and the plastic gas pipeline 211, the air tight engagement of the air tight apparatus 220 with the tee 212, the air tight engagement of the driving tool 260 with the air tight apparatus 220, and the air tight engagement between the extension shaft 270 and the driving tool housing 262. When the cutter 240 is retracted to above the ball valve 230, the ball valve 230 can be closed by actuating the ball valve handle 232. This is shown in FIG. 9.

Thereafter, the cutter 240 and driving tool 260 can be removed from engagement with the air tight apparatus 220. As shown in FIG. 11, the inflatable air bag pipeline stopper 10 of the present invention can then be interconnected with the air tight apparatus 220. The cylindrical stopper housing 20 is inserted into the cylindrical interior 223 of the housing 222 of the air tight apparatus 220, in air tight engagement therewith. Then, the ball valve 230 is opened by actuating the ball valve handle 232 and the cylindrical stopper housing 20 is fully inserted into the air tight apparatus 220 such that the insertion tip extends into the plastic gas pipeline 211 through the hole cut therein. The inflatable air bag pipeline stopper 10 can then be utilized as herein set forth.

One of the safety standards in the gas industry requires that a hole drilled into a steel or cast iron gas pipeline cannot be any larger than 25% of the nominal diameter of the pipe being tapped except for pipe sizes 2" & 3" in diameter. Rather than having an entire inserting device for each size gas main, it is more cost effective to a series of small removable reducers 28 and insertion tips 30 which reduce the cylindrical stopper housing 20 at its base, where the air bags are ejected into the gas pipeline, to the proper size required for the size pipe being worked on. These reducers are easily removable from the cylindrical stopper housing 20 since they are manually threaded thereon. The inflatable bag inserting devices currently on the market, such as the Garner Goodman Stopper, and other patented devices all require completely different sized inserting cylinders for each size gas pipeline. This feature of the invention is, therefor, more cost effective.

This invention provides for a commercially available venturi-type vacuum pump to be connected to the air lines 40 at the quick disconnect coupling at the top thereof. The base of the venturi vacuum pump is fitted with the male part of the quick disconnect coupling and the other end of the pump is fitted with a long air hose. The venturi pump creates a vacuum by forcing air across the air line. Thus, a vacuum is created at the other end of the air line at the air bag which is attached to the moveable bag inserting and retracting plunger assembly to rapidly deflate the air bags. This quick deflation of the air bags requires much less upwards force to be exerted on the moveable bag inserting and retracting assembly in order to retract the air bags into the cylindrical stopper housing 20 when the stop off is completed, thereby making this operation much easier. Furthermore, much less time is required to retract and deflate the air bags as well as reducing the strain and stress exerted on them during this operation.

The method of using the inflatable gas pipeline stopper of the present invention comprises numerous steps. First, before use, the stopper apparatus must be prepared through the following steps:

1. selecting the correct diameter air bag for use in the gas main to be stopped off;
2. extending both moveable bag inserting and retracting plunger assemblies through the cylindrical stopper housing until the threaded ends of the moveable bag inserting and retracting plunger assemblies extend beyond the bottom of the housing;
3. attaching the deflated air bags onto both moveable bag inserting and retracting plunger assemblies;
4. orienting the bags so that they point in opposite directions from each other;
5. adjusting the directional indicators to point in the same direction as the corresponding bags;
6. attaching the inflating and deflating pressure monitoring assembly to the top of each moveable bag inserting and retracting plunger assembly;
7. inflating each air bag sufficiently in order to make them round;
8. applying lubricant to the outside diameter of each air bag in order to facilitate its withdrawal into the cylindrical stopper housing;
9. deflating the bags;
10. withdrawing the bags completely into the cylindrical stopper housing, by means of the handles, until the bags are positioned one above the other within the cylindrical stopper housing; and
11. adjusting the moveable bag inserting and retracting plunger assembly stop collars on the air lines to correspond to the distance the air bags must be plunged down into the gas pipeline.

Attaching the Mueller machine or other similar type machine to the gas main comprises the steps of:

1. attaching the Mueller machine to the gas pipeline by fastening the chains around the gas pipeline;
2. attaching the chains to bolts on the ears of the Mueller machine;
3. attaching stabilizer cords to the Mueller machine;
4. drilling a hole into the gas main; and
5. closing the working chamber slide valve on the Mueller machine after drilling the hole to prevent any gas from escaping.

The method of inserting the housing into the Mueller machine or other similar type machines comprises the steps of:

1. sliding the sealing clamp onto the housing;
2. attaching the proper size reducer and insertion tip to the base of the housing;
3. sliding the sealing clamp onto the Mueller machine;
4. fitting the rubber liner into the sealing clamp;
5. opening the working chamber slide valve on the Mueller machine;
6. seating the reducer adapter into the hole in the gas pipeline;
7. tightening the bolts on the clamp to attach the housing to the Mueller machine;
8. fastening the stabilizer cord to the housing;
9. inserting the downstream air bag into the gas main by pushing downward on the handle of the proper plunger assembly;
10. inflating the downstream air bag to the recommended pressure;
11. inserting the upstream air bag into the gas main by pushing downward on the handle of the proper moveable bag inserting and retracting plunger assembly;
12. inflating the upstream air bag to the recommended pressure; and
13. opening the venting valve located on the cylindrical stopper housing.

The method of removing the gas bags from the gas pipeline comprises the steps of:

1. engaging the clamps on the moveable bag inserting and retracting plunger assembly so that the handles engage the moveable bag inserting and retracting plunger assembly;
2. deflating the upstream air bag first by disengaging the inflate/deflate assembly from the moveable bag inserting and retracting plunger assembly and by attaching a venturi pump to the air line to deflate and the air bag;
3. repeating steps 1 and 2 to deflate the downstream air bag; and
4. retracting the air bags into the cylindrical stopper housing by pulling upward on the proper handle of the moveable bag inserting and retracting plunger assembly.

The method of removing the inflatable gas pipeline stopper from the Mueller machine or other similar type machines comprises the steps of:

1. disconnecting the stabilizing cords;
2. loosening the bolts on the clamp;
3. removing the cylindrical stopper housing from the Mueller machine;
4. closing the slide valve of the Mueller machine to prevent gas from escaping; and
5. inserting a tap hole plug into the gas main.

Having thus described the invention in detail, it is to be understood that the foregoing description is not intended to limit the spirit and scope thereof. What is desired to be protected by Letters Patent is set forth in the appended claims.

What is claimed is:

1. An apparatus for stopping gas flow through a plastic gas pipeline comprising:
   a tee attached to a gas pipeline;
   a stopper housing having a top and a bottom;
   a pair of air lines extending into the stopper housing through the top of the housing, the air lines having upper ends connected to air sources and lower ends;
   an inflatable air bag attached to the lower ends of each of the air lines within the stopper housing;

handle means interconnected with the air lines for inserting and retracting the air lines through the stopper housing and the tee to insert the air bags into a gas pipeline to stop gas flow therethrough;

connection means for connecting the stopper housing to the tee on a gas pipeline, the connection means comprising:

ball valve means attached to the tee; and cylindrical attachment means associated with the stopper housing for attaching to the ball valve to form an air tight fit therewith.

2. The apparatus of claim 1 wherein the ball valve is interconnected by a stem means to a valve handle positioned on the exterior of the housing means for actuating the ball valve from the exterior of the housing means to open or close the ball valve.

3. The apparatus of claim 2 wherein the air bags are bi-directional and one is inserted upstream and the other is inserted downstream into a gas pipeline through a single hole in a gas pipeline.

4. The apparatus of claim 3 wherein the stopper housing includes a vent means for providing a vent between the air bags, through the single hole tapped in a gas pipeline through which the inflatable air bags are inserted.

5. An apparatus for providing an air tight seal for use in stopping gas flow through a plastic gas pipeline comprising:

tee means attached to a plastic gas pipeline;

housing means attached to the tee means, the housing means including valve means;

cutting means slidable through the housing means; and shaft means interconnectable with the cutting means for driving the cutting means, the shaft means including engagement means for engaging the cutting means, and retaining means for retaining the cutting means in engagement with the shaft means; the retaining means comprising magnet means for contacting the cutting means to magnetically retain the cutting means in engagement with the shaft means;

driving means for driving the shaft means and the cutting means to cut a hole in a plastic gas pipeline;

attachment means for attaching an inflatable air bag stopper apparatus having at least two air bags onto the tee means;

insertion means for inserting the air bags through the tee means to extend into a gas pipeline; and inflation means for inflating the air bags to stop gas flow through a gas pipeline.

6. The apparatus of claim 5 wherein the housing means is threadably attached to the tee means.

7. The apparatus of claim 6 wherein the valve means in the housing means comprises a ball valve.

8. The apparatus of claim 7 wherein the ball valve is interconnected by a stem means to a valve handle positioned on the exterior of the housing means for actuating the ball valve from the exterior of the housing means to open or close the ball valve.

9. The apparatus of claim 6 wherein the cutting means comprises a cylindrical body having a lower cutter edge and an upper wall having cutter attachment means associated therewith for interconnecting the cutting means with the shaft means.

10. The apparatus of claim 9 wherein the engagement means for engaging the cutting means with the shaft means comprises a hexagonal receptacle in the upper wall of the cutting attachment means for receiving a hexagonal nut associated with the shaft means.

11. The apparatus of claim 10 wherein the driving means comprises a body attachable to the housing means, the body having an aperture therethrough for movably receiving the shaft means therethrough, the shaft means including a hexagonal nut at a lower end thereof for engaging the hexagonal receptacle of the cutting means.

12. A method of stopping gas flow through a plastic gas pipeline comprising the steps of:

mounting a tee to a gas pipeline;

attaching an air tight assembly having a valve to the tee;

interconnecting a cutting tool to a driving tool;

attaching the driving tool to an upper end of the air tight assembly, the cutting tool extending within the air tight assembly;

sliding the cutting tool through the air tight assembly to against a plastic gas pipeline by manipulating the driving tool;

driving the cutting tool with the driving tool to cut a hole in a plastic gas pipeline;

retracting the cutting tool through the air tight assembly to an upper portion of the air tight assembly above the valve;

closing the valve;

removing the driving tool and the cutting tool from the air tight assembly;

attaching an inflatable air bag stopper apparatus having at least two air bags onto the air tight assembly;

opening the valve;

sliding the air bags down the air tight assembly to extend into a gas pipeline; and inflating the air bags to stop gas flow trough a gas pipeline.

13. The method of claim 12 wherein the step of attaching the air tight assembly having a valve to the tee comprises threadably engaging the air tight assembly to the tee.

14. The method of claim 13 wherein the step of closing the valve comprises manipulating a handle interconnected with the valve to close the valve.

* * * * *